Dec. 29, 1953  H. E. GIROZ  2,664,168
ADJUSTABLE AIRPLANE-HELICOPTER AIRSCREW
Filed July 26, 1949

INVENTOR
Henri Edmond Giroz
By O'Boyle & Blair
ATTORNEYS.

Patented Dec. 29, 1953

2,664,168

UNITED STATES PATENT OFFICE 2,664,168

ADJUSTABLE AIRPLANE-HELICOPTER AIRSCREW

Henri Edmond Giroz, Paris, France

Application July 26, 1949, Serial No. 106,875

4 Claims. (Cl. 170—160.42)

1

This invention relates to aircraft and airscrews and more particularly to aircraft in which a prime mover is utilised to drive an electric generator the output of which is supplied to electric motor means for the drive of airscrew means; various features of the invention are particularly suitable for use with so-called helico-planes, that is to say aeroplanes of the type described and claimed in my co-pending application Serial No. 33,139, filed June 15, 1948, in which electrically driven airscrew rotors are adapted to be tilted from a horizontal position in which they are adapted to operate as rotary wings to a vertical position in which they are adapted to act as propellers. In suitable cases these may be pairs of coaxial, counter-rotating airscrews respectively driven by the oppositely rotating field and armature parts of a suitably designed electric motor.

Most of the arrangements described hereafter are aimed at the delicate problem of obtaining in such "helico-planes" a good efficiency of airscrew rotors, both when the aircraft is operated as a classical aeroplane and when it works as a rotary-wing aircraft.

It is well known, that apart from the fact that the rotor of a helicopter and the propeller of an aeroplane differ in size and speed, another important difference consists in that the former works at an almost negligible speed of translation of the rotor plane, while in the case of the latter the speed of translation of the propeller plane is equal to the forward speed of the aircraft.

On account of its low speed of translation, the design of the rotor blades of the helicopter has generally the following characteristic features:

(a) The angle of incidence is constant, or substantially constant, along the whole length of the blade.

(b) This angle is small and is controlled during flight. It can be made negative when the rotor starts "auto-rotating" during the descent of the craft.

On account of its high speed of translation, the design of a rotor working as an aeroplane propeller involves very different considerations, viz:

(a) In order to obtain high aerodynamic efficiency, the angle of incidence must be variable along the length of the blade: it is larger in the proximity of the shaft, i. e. where the peripheral speed is smaller, than near the tip of the blade, where the peripheral speed is at its maximum, the said angle of incidence decreasing in accordance with a given law of variation when passing from the shaft towards the tip of the blade.

(b) The average incidence of a blade should be varied as a function of the speed of translation of the rotor.

It is, therefore, difficult to design a rotor which will work satisfactory both as a lifting or supporting airscrew (rotary wing) and as a propeller. It is no doubt possible, with mechanical care and the use of the means as described in my above-mentioned co-pending application, to keep the same diameter and the same speed of rotation in both the helicopter rotor and the aeroplane propeller, using to that effect a single or multistage speed reducer (preferably made of epicycloid gears), so that the rotor speed is made low enough for enabling one and the same airscrew to work either as a helicopter rotor or as a propelling screw in spite of its necessarily large diameter.

But there are greater difficulties to be overcome in the structure of a blade intended for alternative use in both the above cases. In effect, in order to change over from the working as a helicopter airscrew to the working as a screw propeller, the incidence of the blades has to be changed from a constant low value to a value the average of which is higher than the said constant value, and which moreover varies along the length of the blade: Thus not only an increase in the incidence of the blade is required, (which can be obtained easily) but also a twisting or skew of the blade to permit the changing from a constant incidence value throughout the length of the blade to a value which decreases towards the tip of the blade in proportion with the increasing distance from the shaft.

An object of the present invention is therefore to provide means which permit to obtain in full flight the required variation of the blade structure of a rotor when changing from use as an helicopter rotor to use as a screw propeller or vice versa.

Preferably the motor and its coaxial reducer, instead of having their common axis parallel to the axis of the aircraft are so disposed that the said common axis is perpendicular (transverse) to the axis of the fuselage or aircraft, the motor being nearer to the latter axis than the reducer and being housed, wholly or in part in the root portion of the wings, the latter portion being fixed to the fuselage, while the reducer is located in the outer part of the said wings, which is adapted to be tilted with the axis of the rotors, the common axis of the motor and of the reducer coinciding with the axis of a tubular main shaft around which the outer wing section and the rotors are turned when changing between the cruising and helicopter positions.

This arrangement has the advantages of avoiding the gyroscopic effect which would take place if the change in orientation of the rotors would involve a change in the orientation of the motor shafts, and of facilitating the control of the pitch and of the "twist" of the rotor blades since the sliding devices used for these controls move perpendicularly to the common axis of the motor and of the reducing gear, thus avoiding any interference from these, the transmission between the motor shaft and the reducer-shaft being effected, for instance, by means of conical gears.

Alternatively the motor, thanks to the disposition of the common axis of the motor and reducer transversely of the aircraft, may remain fixed in the fixed part of the wing root or foot, and the reducer may also be kept fixed in relation to the orientable portion of the wing, while the bearings of the various stages of the reducer may be turned in relation to the bearings of the motor in accordance with the position of the orientable part of the wing.

According to a further aspect, the shaft of the turbo-generator unit, which is housed in the main fuselage and serves to produce the electric power for the motors, is vertical, so that the gyroscopic effect can be used for increasing the longitudinal and lateral stability of the aircraft while avoiding its interfering with any desired changes of the direction of the aircraft in a horizontal plane.

According to a feature of the invention means are provided to twist the blades of a rotor in full rotation when changing from helicopter to aeroplane-type operation. To this effect, a blade is provided with two controls, the first one being the normal pitch control, while the second control, independent of the first one, permits the relative positions of the parts of the blade to be varied, the blade being composed of a number of individual elements each of which is formed integral with one of a number of independent drums which are arranged coaxially with and rotatably on the main spar which is actuated by the pitch control device. Each one of these drums can therefore rotate about the main spar, taking with it the individual blade element with which it is formed as one piece.

When the blade is working as a helicopter blade, each of its constituent elements has the same small angle of incidence. When working as an aeroplane blade, the constituent elements of the blades have angles of incidence which decrease with increasing distance of an element from the rotor shaft. These unequal adjustments of the incidence of the blade elements are obtained by means of a single control, which comprises a rod sliding within the main spar of the blade and carrying as many pins as there are blade elements. Each one of these pins passes through a rectilinear slot along a generatrix of the tubular main spar, and also through a helical slot of one of the drums, the helical pitch of each being the greater the nearer the blade element of the particular drum is to the shaft. Thus the sliding rod when moving towards the rotor shaft, rotates by unequal angles the blade elements, the angle of rotation of an element being the greater, the nearer the element is to the shaft.

According to a further feature, the effect of the centrifugal force upon the rod controlling the twist or skew is compensated by means of a small counterweight mounted at the inner end of that rod which for this purpose is extended across the hub, the mass of the counterweight and its distance from the axis of rotation being so determined that the component of the said centrifugal force along the axis of the rod is balanced when the rod occupies its normal position. The effect of the counterweight is assisted by the action of a spring which develops a return force as soon as the control rod moves out of its normal position, the return force thus developed being arranged to balance the residual centrifugal effect developed as soon as the rod moves along the axis of the control rod out of the normal position at which the centrifugal forces are balanced.

In order that the invention may be more readily understood, some instances of application of the invention will now be described, by way of non-limitative examples, with reference to the accompanying drawings.

Figure 1:
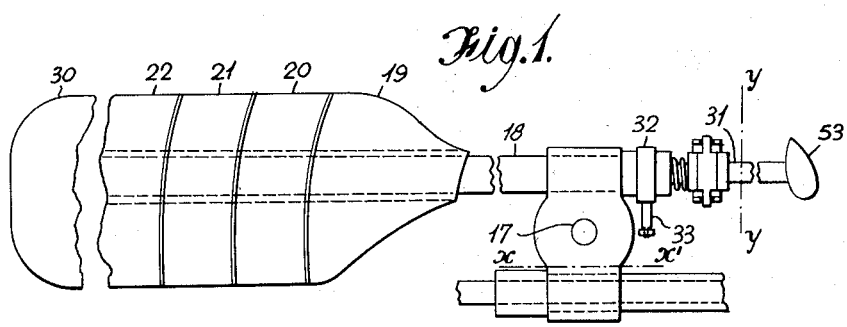
Fig. 1 is a plan view of a rotor blade embodying the invention.
Figures 2, 3:
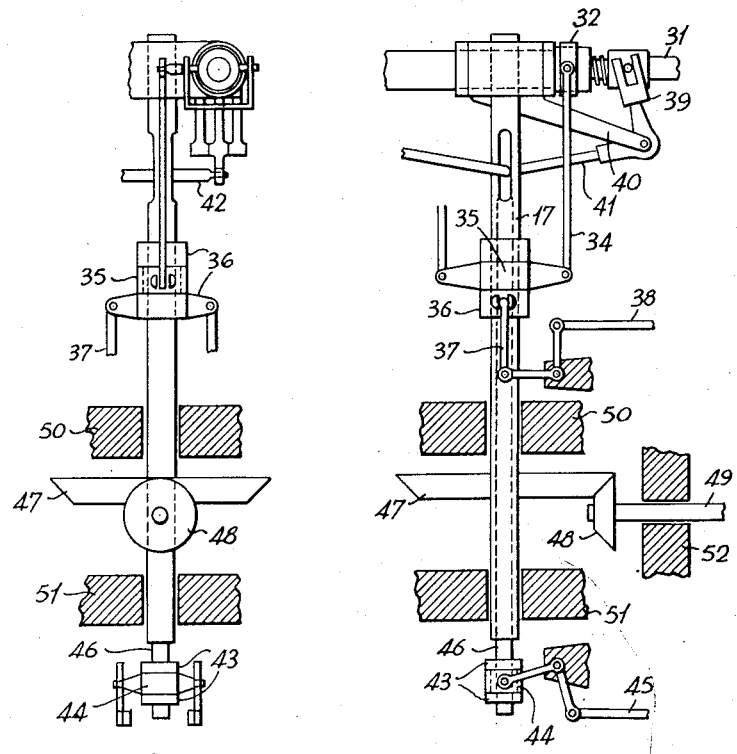
Fig. 2 is a section on line X—X' of Fig. 1.
Fig. 3 is a section on line Y—Y' of Fig. 1.

Referring first to Figs. 1 to 3, the blade of the illustrated propeller is composed of several elements 19 to 30, each one of them adapted to rotate by a different angle around the tubular spar 18. The elements 19–30 are limited laterally by cylindrical coaxial surfaces having for a common axis the axis of the shaft 17. Each element, such as 20, comprises a tubular drum-like section solidary with it, which can turn about the main spar 18. A rod 31 is slidably mounted within the spar 18. The variation of pitch can be obtained by means of any of a variety of suitable devices, one form of suitable means being shown at 32, 33, 34, 35, 36, 37. The spar 18 fast with a ring 32, can be turned about its axis by the pin 33, link 34, and the slidable rings 35 and 36. These slidable rings move together in the translation movement along the shaft 17, under the action of the control rods, but ring 35 participates in the rotary motion of the blades and of the pitch control system, while ring 36 does not participate therein, being prevented from rotation by the control rods 37. The rings 35 and 36 are rotatably connected, for example by means of a ball bearing. The control of the skew of the blade is effected through the elements 39 to 45 of which element 39 leads to the control position of the aircraft to be operable by the pilot. The arm 40, which is integral with the hub of the airscrew, determines the pivot of a bellcrank lever composed of a fork 39 and a rod 41, said lever being actuated by a sliding rod 46 through an arm 42 which passes through a slot extending along a generatrix of shaft 17. Similarly as above, two sliding rings 43 and 44 are connected for common translation movement with the rod 46, which latter slides in the tubular shaft 17 being moved by the action of a rod 45. But while the ring 43 participates with the rod 46, in the rotary motion of the blades and of the skew control system, the ring 44 does not participate in this rotation, being connected to the control rod 45. The rings 43 and 44 are rotatably interconnected, for example by means of a ball-bearing system. Movement of the sliding rod 46, through the intermediary of fork 39 and rod 41, causes the rod 31 to slide within the spar 18, and this movement of the rod 31 relative to the spar 18 causes the individual variation in the incidence of the elements 19 to 30 in accordance with the situation of each element on the spar, or more precisely with its distance from the shaft.

The motor torque supplied by the shaft 49 is transmitted by bevel gears 47—48 to the main shaft 17. Owing to this arrangement the respective directions of the motor shaft 49 and of the axes of the actuating rods 38 and 45 may be arranged fully separate, in a direction differing from the one of the axis of the main shaft 17. The shafts 17 and 49 rotate in bearings shown schematically at 50, 51, 52, all these bearings being connected rigidly, either with the orientable propelling nacelle, or with the orientable part of the wing (according to which of the two forms of aircraft described in my above-mentioned copending application is used).

In order to reduce to a minimum the axial force to be applied to the rod 31 for adjusting the skew, use is made of a device for compensating the centrifugal force. This device includes the mass 53 (Fig. 1), which has for effect to balance the action of the centrifugal force on the part of rod 31 which is situated on the side of the blade when the rod 31 is in its normal middle position. A spring compensates for the residual centrifugal force which develops when the rod 31 is moved from the position for which that force is strictly balanced.

For a better understanding of the devices shown in Figs. 1 to 3, a purely schematic representation has been given of the pitch and skew controls, with the omission of all the accessory devices such as for example: the cardan joints of the blades, which permit the inconveniences of the gyroscopic effects to be avoided, the system of cyclic variation of the pitch, the devices permitting to compensate the centrifugal torsion torque of the blades, etc.

Figures 4, 5:
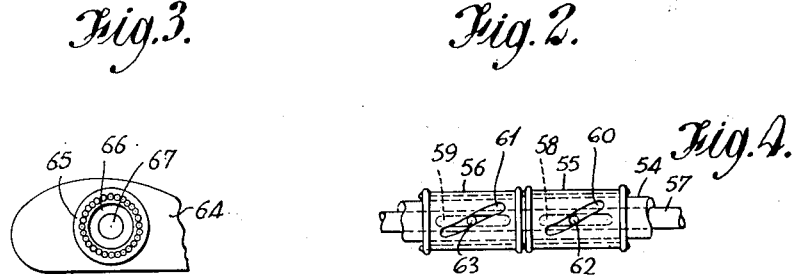
Figs. 4 and 5 illustrate details of the blade shown in Fig. 1.

Fig. 4 illustrates how the movement of the central rod 31 in the main spar 18 produces a variation in the incidence of the blade elements. In that Fig. 4, a portion of the main spar is seen at 54. On that spar are rotatable the drums 55, 56 each of which is associated with a blade element. A portion of the actuating rod which slides in the spar element 54, is shown at 57. The main spar is provided with rectilinear slots 58, 59, extending along one or several generatrices of the spar 54, these slots being shown in dotted lines. For a better understanding of the device, the slots 58, 59 have been shown on one generatrix only, but it would be preferable to make them along various generatrices of the cylinder surface of the spar 54 in order to increase the resistance of the spar tube. The indications given hereafter would apply to such an arrangement without a change. The helical slots in the drums 55, 56 are shown at 60, 61. Since it is assumed that 55 is nearer the shaft than 56, the helical pitch of the slot 60 is greater than that of the slot 61. The pins 62 and 63 rigid with the rod 57 and participating in its axial sliding movement, slide simultaneously along the slots 58, 59 on the one hand, and 60, 61 on the other hand. Thus displacement of the rod 57 and of the pins 62, 63 from left to right produces a rotation of the drums 55 and 56, the former rotating by a larger angle than the latter.

Fig. 5 is a section of a blade element 64 with its associated drum 65, 66 being the main spar around which the drum 65 turns, and 67 being the central rod effecting the adjustment of the skew.

It should be understood that the above-described arrangements can be varied without in any way affecting the essential features of the invention. For example, the individual blade elements can be replaced by ribs or flanges, each rib being associated with one of the drums. The whole of the ribs can then be covered by a tissue or even an elastic metal sheet, coated with a likewise elastic varnish, so that the whole of the surface enveloping the ribs can be twisted without tearing or cracking. With this variant, the discontinuous outer surface of the system shown in Fig. 4 is replaced by a twisted continuous area.

It is also possible to associate the movement of the twist-varying system with the movement of the pitch control. For this purpose it is sufficient that control movement of the group of sliding rings actuating the pitch system should produce movement of the sliding rings controlling the twist or skew according to a predetermined law. The control is thus reduced to one system only, the one of the pitch, and the law of association of the skew control and the pitch control is to be such that, with a small pitch, corresponding to the helicopter, the skew is reduced to nil, all the blade constituents having the same incidence, while when the pitch is gradually increased towards the values which are suitable for the aeroplane, the twist increases in accordance with a predetermined law. It should be understood that a cam system would permit to keep the twist nil when the incidence is to become negative, i. e. when in working as a helicopter the craft uses auto-rotation.

The purely mechanical device described above, which has been described as including (for the sake of simplicity in the explanation of the principles) sliding rings, rods and so on, can be replaced by other systems, for instance hydro- or oleo-pneumatic apparatus, or by electro-mechanical devices. In the case of hydro- or oleo-pneumatic systems, the forces to be applied to the controls are developed by pistons, and the actuating rod systems are replaced by water or oil distributing pipes. In the case of an electro-mechanical system, these forces can be developed by small auxiliary motors, which since they revolve at very high speeds, only require very little space; they can, moreover, be moved with the whole of the rotating system, provided their electric supply is conducted through rings and brushes. This electro-mechanical control of the pitch and of the skew lends itself to considerable simplification in comparison with purely mechanical systems, on account of the fact that the actuating forces, instead of being developed through the intermediary of fixed devices and transmitted to the controlled rotary devices, are developed by means of very light motors, which may rotate with the remaining devices so that they move with them and remain in fixed relation therewith.

I claim:

1. An airscrew for aircraft, comprising a rotatable shaft, a set of blades mounted on said shaft for common rotation therewith about the axis of said shaft, each blade comprising a rod-like spar member extending substantially radially of said shaft, and a plurality of profiled blade sections, each rotatably mounted on said spar member to jointly constitute a blade member, skew-control means engaging said blade sections and movable relatively to each of said spar members for differentially rotating said blade sections on each of said spar members to vary the skew of the blades, said spar members being mounted on said shaft so as to be rotatable about their respective axes, said airscrew also comprising actuating means connected to said skew-control member and rotatable with and movable axially relative to said shaft for actuating said skew control means, and pitch-control means connected to said spars and rotatable with and movable axially relative to the shaft for rotating the spar members about their axes.

2. An airscrew as claimed in claim 1 wherein said spar members are of tubular construction and each formed with a longitudinally extending slot inside each blade section and each blade section comprising a bearing bush rotatably seated on said spar and provided with a helical slot, said skew control means comprising in each blade a control rod slidable in the spar member longitudinally thereof and a plurality of pins each extending from said control rod respectively through said longitudinal slots into the helical slots of the associated bearing bushes.

3. Aircraft as claimed in claim 2, comprising counterweights located at the ends of said control rods remote from the respective blades and beyond the axis of the airscrew means, the mass and distance of the counterweights being so determined as to balance at a predetermined position of the control rod the component of the centrifugal force on the said control rod in the direction of its axis.

4. Aircraft as claimed in claim 3, further comprising springs each engaging a spar and the associated control rod for biasing said control rod towards the said position.

HENRI EDMOND GIROZ.

References Cited in the file of this patent

UNITED STATES PATENTS

| Number | Name | Date |
| --- | --- | --- |
| 1,623,613 | Arndt | Apr. 5, 1927 |
| 1,795,334 | Hall | Mar. 10, 1931 |
| 1,846,992 | Decker | Feb. 23, 1932 |
| 1,867,963 | Blahnik | July 19, 1932 |
| 2,230,370 | Baynes | Feb. 4, 1941 |
| 2,462,201 | Kilgore | Feb. 22, 1949 |
| 2,475,121 | Avery | July 5, 1949 |
| 2,484,099 | Koeppe | Oct. 11, 1949 |
| 2,584,663 | Bensen | Feb. 5, 1952 |

FOREIGN PATENTS

| Number | Country | Date |
| --- | --- | --- |
| 851,766 | France | Oct. 9, 1939 |